(12) United States Patent
Seo et al.

(10) Patent No.: US 12,260,813 B2
(45) Date of Patent: Mar. 25, 2025

(54) DISPLAY DEVICE HAVING A SHORT CIRCUIT PROTECTION PART TO OUTPUT A SHUTDOWN SIGNAL

(71) Applicant: Samsung Display Co., Ltd., Yongin-Si (KR)

(72) Inventors: Jeongmin Seo, Yongin-si (KR); Sungchun Park, Yongin-si (KR)

(73) Assignee: Samsung Display Co., Ltd., Yongin-Si (KR)

( * ) Notice: Subject to any disclaimer, the term of this patent is extended or adjusted under 35 U.S.C. 154(b) by 0 days.

(21) Appl. No.: 18/369,842

(22) Filed: Sep. 19, 2023

(65) Prior Publication Data

US 2024/0296790 A1    Sep. 5, 2024

(30) Foreign Application Priority Data

Mar. 2, 2023   (KR) .................. 10-2023-0027698

(51) Int. Cl.
   *G09G 3/3208*   (2016.01)
   *H02H 1/00*     (2006.01)
   *H02H 7/20*     (2006.01)
   *H02M 3/158*    (2006.01)

(52) U.S. Cl.
   CPC ......... *G09G 3/3208* (2013.01); *H02H 1/0007* (2013.01); *H02H 7/20* (2013.01); *H02M 3/158* (2013.01); *G09G 2310/08* (2013.01); *G09G 2330/02* (2013.01); *G09G 2330/04* (2013.01)

(58) Field of Classification Search
   CPC ................................................ G09G 3/3208
   USPC ....................................................... 345/212
   See application file for complete search history.

(56) References Cited

U.S. PATENT DOCUMENTS

| | | | |
|---|---|---|---|
| 9,058,773 B2 | 6/2015 | Park | |
| 10,972,008 B2 | 4/2021 | Lee | |
| 11,605,327 B2 | 3/2023 | Lee | |
| 2012/0127213 A1* | 5/2012 | Park | G09G 3/32 345/212 |
| 2020/0144916 A1* | 5/2020 | Lee | H02M 1/36 |
| 2021/0264834 A1* | 8/2021 | Lee | G09G 3/20 |

FOREIGN PATENT DOCUMENTS

| | | |
|---|---|---|
| KR | 10-1860739 B1 | 5/2018 |
| KR | 10-2020-0051900 A | 5/2020 |
| KR | 10-2021-0107967 A | 9/2021 |

* cited by examiner

*Primary Examiner* — Long D Pham
(74) *Attorney, Agent, or Firm* — Innovation Counsel LLP

(57) ABSTRACT

Disclosed is a display device which includes a voltage generator including a first converter that generates a first voltage using an input voltage and is shut down in response to a shutdown signal and a short circuit protection part including a first short circuit protection part that compares an output voltage of an output terminal of the first converter with a first reference voltage and outputs the shutdown signal. The first converter pre-charges the output voltage to a predetermined voltage level during a first period, maintains a level of the output voltage during a second period subsequent to the first period, and boosts and outputs the output voltage as the first voltage during a third period subsequent to the second period. The first short circuit protection part outputs the shutdown signal when the output voltage in the second period has a level lower than that of the first reference voltage.

20 Claims, 8 Drawing Sheets

DISPLAY DEVICE HAVING A SHORT CIRCUIT PROTECTION PART TO OUTPUT A SHUTDOWN SIGNAL

CROSS-REFERENCE TO RELATED APPLICATIONS

This application claims priority under 35 U.S.C. § 119 to Korean Patent Application No. 10-2023-0027698 filed on Mar. 2, 2023, in the Korean Intellectual Property Office, the disclosures of which are incorporated by reference herein in their entireties.

BACKGROUND

In general, an electronic device, such as a smartphone, a digital camera, a laptop computer, a navigation system, and a smart television, which provides a user with an image and includes a display device for displaying the image. The display device generates an image and provides the user with the generated image on a display screen.

The display device includes a display panel including a plurality of pixels for generating images, a driver for driving the pixels, and a voltage generator for supplying an operating voltage to the pixels. The voltage generator generates a first voltage and a second voltage for operating the pixels. The first voltage and the second voltage are applied to the pixels through a power line. It is required to develop a technology for protecting the voltage generator when a short circuit of the power line occurs.

SUMMARY

Embodiments of the present disclosure provide a display device for protecting a voltage generator when a short circuit of a power line occurs.

According to an embodiment, a display device may include a voltage generator including a first converter that generates a first voltage using an input voltage and shut down in response to a shutdown signal, a display panel including a pixel for receiving the first voltage, and a short circuit protection part including a first short circuit protection part that compares an output voltage of an output terminal of the first converter with a first reference voltage and outputs the shutdown signal depending on the compared result. The first converter may pre-charge the output voltage to a predetermined voltage level during a first period, may maintain a level of the output voltage during a second period subsequent to the first period, and may boost and output the output voltage as the first voltage during a third period subsequent to the second period. The first short circuit protection part may output the shutdown signal when the output voltage in the second period has a level lower than that of the first reference voltage.

According to an embodiment, a display device may include a voltage generator including a first converter that generates a first voltage using an input voltage and shut down in response to a shutdown signal, a display panel including a pixel for receiving the first voltage, and a short circuit protection part including a first short circuit protection part that compares an output voltage of an output terminal of the first converter outputting the first voltage with a first reference voltage and outputs the shutdown signal depending on the compared result. The first converter may pre-charge the output voltage to a predetermined voltage level during a first period, may maintain a level of the output voltage during a second period subsequent to the first period, and may boost and output the output voltage as the first voltage during a third period subsequent to the second period. The first short circuit protection part may output the shutdown signal when the output voltage has a level lower than that of the first reference voltage and maintains the level lower than that of the first reference voltage during a first holding period in the second period.

BRIEF DESCRIPTION OF THE FIGURES

The above and other objects and features of the present disclosure will become apparent by describing in detail embodiments thereof with reference to the accompanying drawings.

DETAILED DESCRIPTION

Figure 1:
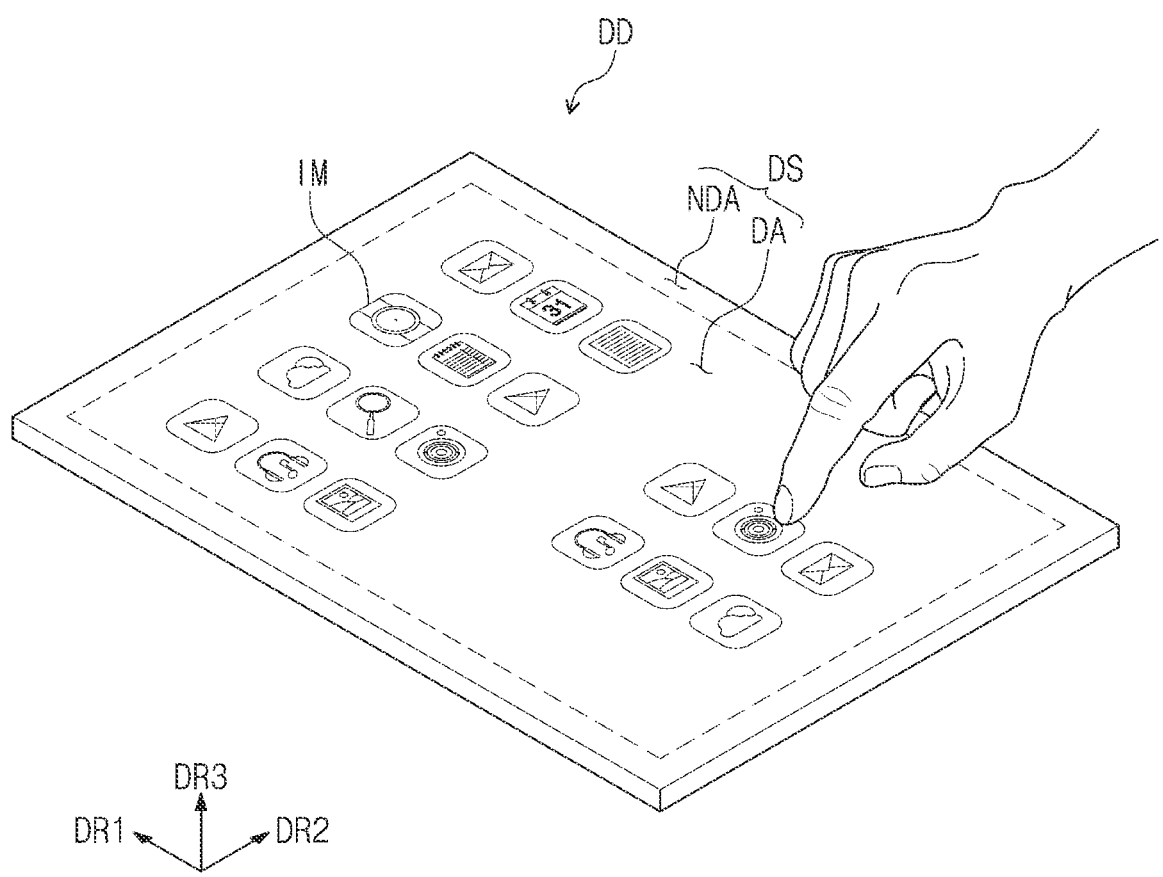
FIG. 1 is a perspective view of a display device according to an embodiment of the present disclosure.

In the specification, when an element (or an area, a layer, a part, or the like) is referred to as "being on," "being connected to," or "being coupled to" another element, this indicates that the element may be directly on/connected to/coupled to the another element or a third element may be therebetween.

Like reference numerals refer to like elements. Also, in the drawings, the thicknesses, the ratios, and the dimensions of the components may be exaggerated for effective description of technical contents.

The expression "and/or" includes all combinations of one or more of the associated listed items.

Although the terms such as "first," "second," or the like may be used herein to describe various elements, these elements should not be limited by these terms. These terms are only used to distinguish one element from another element. For example, a first element could be termed a second element without departing from the scope of the claims of the present disclosure, and similarly a second element could be termed a first element. The articles "a," "an," and "the" are singular in that they have a single referent, but the use of the singular form in the specification should not preclude the presence of more than one referent.

Also, the terms "under," "beneath," "on," "above," etc. are used to describe a relationship between components illustrated in a drawing. These terms are relative concepts and are described on the basis of the directions shown in the drawings.

Unless otherwise defined, all terms (including technical terms and scientific terms) used in the specification have the same meaning as commonly understood by one skilled in the art to which the present disclosure belongs. Furthermore, terms such as terms defined in the dictionaries commonly used should be interpreted as having a meaning consistent with the meaning in the context of the related technology, and should not be interpreted in ideal or overly formal meanings unless explicitly defined herein.

It will be further understood that the terms "comprises," "includes," "have," etc. specify the presence of stated features, numbers, steps, operations, elements, components, or a combination thereof but do not preclude the presence or addition of one or more other features, numbers, steps, operations, elements, components, or a combination thereof.

Hereinafter, embodiments of the present disclosure will be described with reference to the accompanying drawings.

FIG. 1 is a perspective view of a display device according to an embodiment of the present disclosure.

Referring to FIG. 1, a display device DD according to an embodiment of the present disclosure may have a rectangle shape having long sides extending in a first direction DR1 and short sides extending in a second direction DR2 crossing the first direction DR1. However, the present disclosure is not limited thereto. The display device DD may have various shapes such as a circle and a polygon.

Hereinafter, a direction substantially perpendicular to a plane defined by the first direction DR1 and the second direction DR2 is defined as a third direction DR3. Furthermore, in the specification, the expression "when viewed from a plane" or "in a plan view" means a state of being viewed in the third direction DR3.

An upper surface of the display device DD may be a display surface DS and may have a plane defined by the first direction DR1 and the second direction DR2. Images IM emitted from the display surface DS by the display device DD may be provided to a user.

The display surface DS may include a display area DA and a non-display area NDA around the display area DA. The display area DA may display an image, and the non-display area NDA may not display an image. The non-display area NDA may surround the display area DA and may include an area printed in a certain color.

The display device DD may be used for a large electronic device such as a television, a monitor, or an external billboard. Moreover, the display device DD may be used for a small and medium electronic device such as a personal computer, a laptop computer, a personal digital terminal, an automotive navigation system, a game console, a smartphone, a tablet, or a camera. However, the above examples are provided only as an embodiment, and the display device DD may be used to other electronic devices without departing from the concept of the present disclosure.

Figure 2:
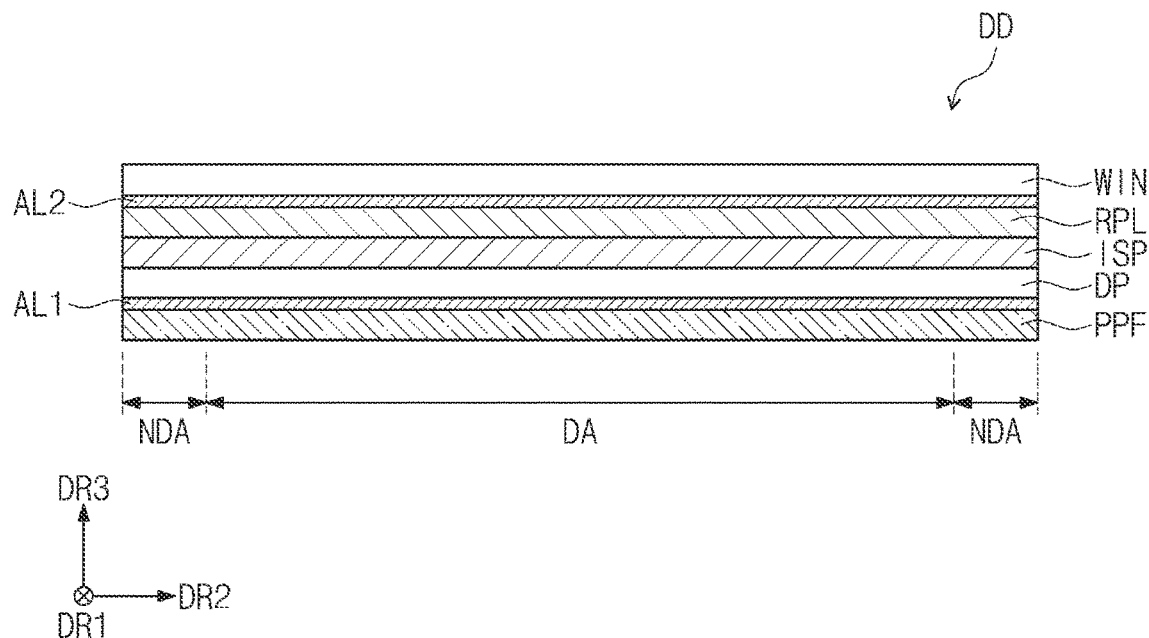
FIG. 2 is a diagram illustrating a cross section of a display device illustrated in FIG. 1.

FIG. 2 is a diagram illustrating a cross section of a display device illustrated in FIG. 1.

Illustratively, FIG. 2 illustrates a cross section of a display device DD viewed from a first direction DR1.

Referring to FIG. 2, the display device DD may include a display panel DP, an input sensing part ISP, an anti-reflection layer RPL, a window WIN, a panel protective film PPF, and first and second adhesive layers AL1 and AL2.

The display panel DP may be a flexible display panel. The display panel DP according to an embodiment of the present disclosure may be, but is not particularly limited to, a light emitting display panel. For example, the display panel DP may be an organic light emitting display panel or an inorganic light emitting display panel. A light emitting layer of the organic light emitting display panel may include an organic light emitting material. A light emitting layer of the inorganic light emitting display panel may include a quantum dot, a quantum rod, and/or the like. Hereinafter, the display panel DP will be described as the organic light emitting display panel.

The input sensing part ISP may be disposed on the display panel DP. The input sensing part ISP may include a plurality of sensing parts (not shown) for sensing an external input in a capacitive manner. When the display device DD is fabricated, the input sensing part ISP may be formed directly on the display panel DP. However, the present disclosure is not limited thereto. The input sensing part ISP may be fabricated as a separated panel and attached to the display panel DP by an adhesive layer.

The anti-reflection layer RPL may be disposed on the input sensing part ISP. When the display device DD is fabricated, the anti-reflection layer RPL may be directly formed on the input sensing part ISP. However, the present disclosure is not limited thereto. The anti-reflection layer RPL may be fabricated as a separate panel and attached to the input sensing part ISP by the adhesive layer.

The anti-reflection layer RPL may include an external light anti-reflection film. The anti-reflection layer RPL may reduce a reflectivity of external light incident toward the display panel DP from the top of the display device DD. The external light may be filtered by the anti-reflection layer RPL and not visible to a user.

When external light incident on the display panel DP is reflected from a surface of the display panel DP and is then provided to an external user, the user may view the display panel like a mirror. To prevent the above phenomenon, illustratively, the anti-reflection layer RPL may include a plurality of color filters displaying the same color as pixels of the display panel DP.

The color filters may transmit external light having the same color as light emitted from the pixels, respectively. In this case, the external light may fail to be visible to the user. However, the present disclosure is not limited thereto. The anti-reflection layer RPL may include a retarder and/or a polarizer to reduce a reflectivity of external light.

The window WIN may be disposed on the anti-reflection layer RPL. The window WIN may protect the display panel DP, the input sensing part ISP, and the anti-reflection layer RPL from an external scratch and impact.

The panel protective film PPF may be disposed under the display panel DP. The panel protective film PPF may protect a lower portion of the display panel DP. The panel protective film PPF may include a flexible plastic material such as polyethyleneterephthalate (PET).

The first adhesive layer AL1 may be disposed between the display panel DP and the panel protective film PPF, and the display panel DP and the panel protective film PPF may attach to each other by the first adhesive layer AL1. The second adhesive layer AL2 may be disposed between the window WIN and the anti-reflection layer RPL, and the window WIN and the anti-reflection layer RPL may attach to each other by the second adhesive layer AL2.

Figure 3:
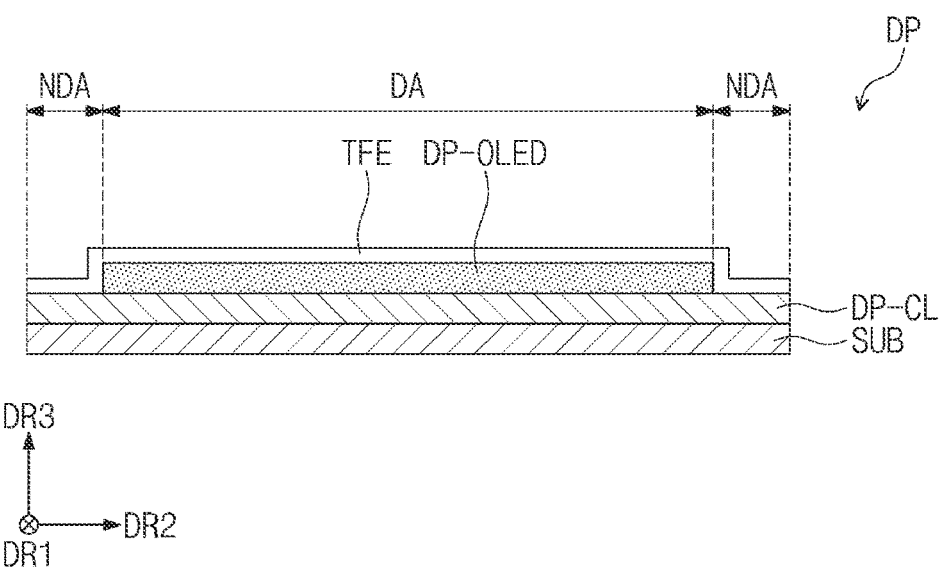
FIG. 3 is a drawing illustrating a cross section of a display panel illustrated in FIG. 2.

FIG. 3 is a drawing illustrating a cross section of a display panel illustrated in FIG. 2.

Illustratively, FIG. 3 illustrates a cross section of a display panel DP when viewed from the first direction DR1.

Referring to FIG. 3, the display panel DP may include a substrate SUB, a circuit element layer DP-CL disposed on the substrate SUB, a display element layer DP-OLED disposed on the circuit element layer DP-CL, and a thin film encapsulation layer TFE disposed on the display element layer DP-OLED.

The substrate SUB may include a display area DA and a non-display area NDA around the display area DA. The substrate SUB may include a glass or a flexible plastic material such as polyimide (PI). The display element layer DP-OLED may be disposed on the display area DA.

A plurality of pixels may be arranged on the circuit element layer DP-CL and the display element layer DP-OLED. Each of pixels may include transistors arranged on the circuit element layer DP-CL and a light emitting element which is disposed on the display element layer DP-OLED and connected to the transistors.

The thin film encapsulation layer TFE may be disposed on the circuit element layer DP-CL to cover the display element layer DP-OLED. The thin film encapsulation layer TFE may protect the pixels from moisture, oxygen, and external foreign substances.

Figure 4:
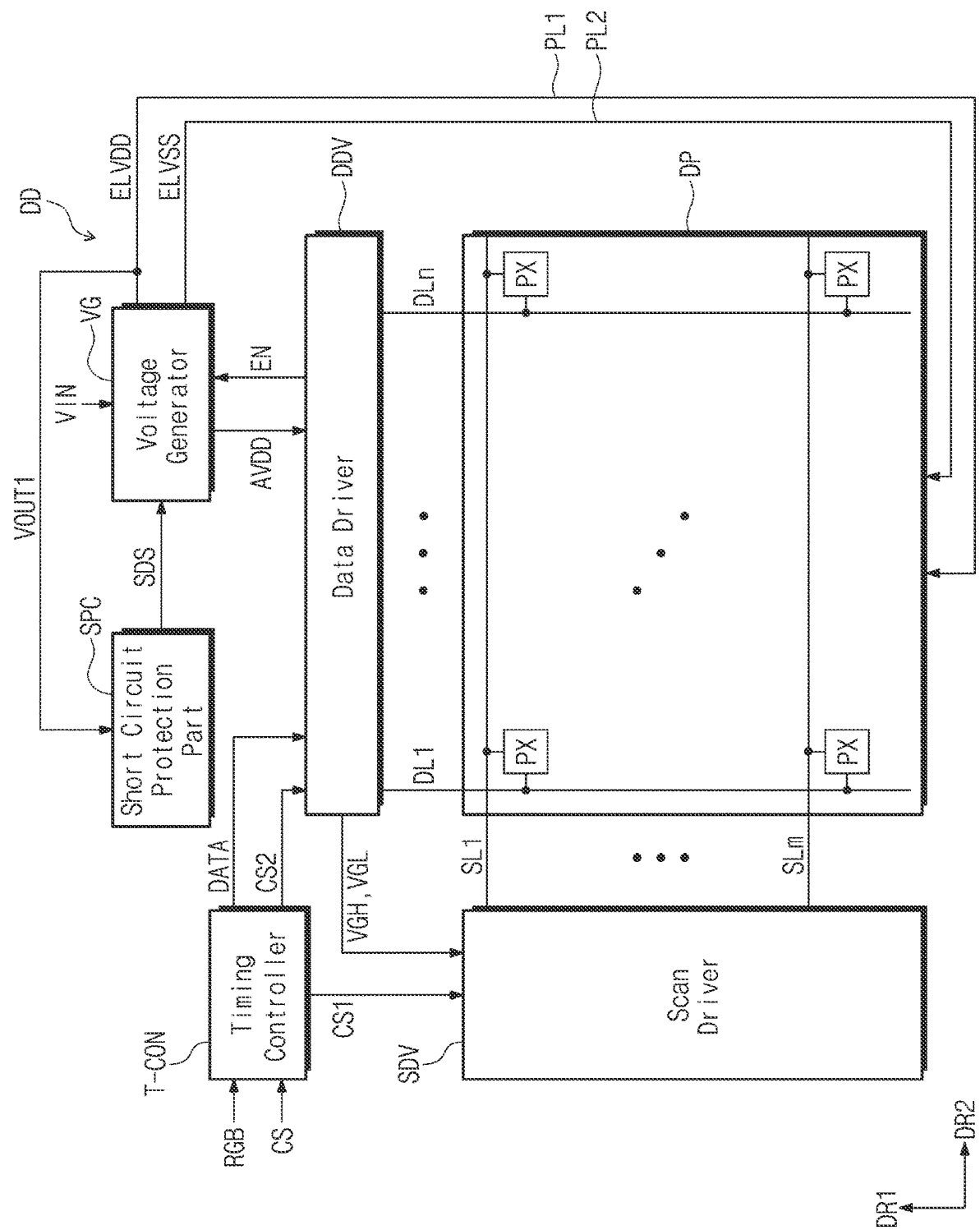
FIG. 4 is a block diagram of a display device illustrated in FIG. 1.

FIG. 4 is a block diagram of a display device illustrated in FIG. 1. Referring to FIG. 1, a display device DD may include a display panel DP, a scan driver SDV, a data driver DDV, a timing controller T-CON, a voltage generator VG, and a short circuit protection part SPC.

The display panel DP may include a plurality of pixels PX, a plurality of scan lines SL1-SLm, and a plurality of data lines DL1-DLn, where m and n are natural numbers. The pixels PX may be arranged in the first direction DR1 and the second direction DR2 and may be arranged in the form of a matrix, but the arrangement state of the pixels PX is not limited thereto.

The scan lines SL1-SLm may extend in the second direction DR2 and connected to the pixels PX and the scan driver SDV. The data lines DL1-DLn may extend in the first direction DR1 and connected to the pixels PX and the data driver DDV.

The voltage generator VG may receive an input voltage VIN from a power device such as a battery. The voltage generator VG may be activated by receiving a control signal EN from the data driver DDV. The voltage generator VG may generate a first voltage ELVDD, a second voltage ELVSS, and a third voltage AVDD in response to the control signal EN. The voltage generator VG may generate the first voltage ELVDD, the second voltage ELVSS, and the third voltage AVDD using the input voltage VIN.

The voltage generator VG may provide the display panel DP with the first voltage ELVDD and the second voltage ELVSS. The first voltage ELVDD may have a level higher than that of the second voltage ELVSS. The first voltage ELVDD may be supplied to the display panel DP through a first power line PL1. The second voltage ELVSS may be supplied to the display panel DP through a second power line PL2.

The first voltage ELVDD and the second voltage ELVSS may be supplied to the pixels PX. Substantially, the first and second power lines PL1 and PL2 may extend into the display panel DP and connected to the pixels PX, and the first and second voltages ELVDD and ELVSS may be supplied to the pixels PX through the first and second power lines PL1 and PL2. The pixels PX may be driven by the first voltage ELVDD and the second voltage ELVSS.

The voltage generator VG may supply the third voltage AVDD to the data driver DDV. The third voltage AVDD may be a source driving voltage necessary for the driving of the data driver DDV. The data driver DDV may generate a high voltage VGH and a low voltage VGL, using the third voltage AVDD. The data driver DDV may supply the high voltage VGH and the low voltage VGL to the scan driver SDV.

The scan driver SDV may operate by the high voltage VGH and the low voltage VGL supplied from the data driver DDV. For example, the high voltage VGH and the low voltage VGL may have voltage levels for turning on and off transistors in the scan driver SDV.

The timing controller T-CON may receive image signals RGB and a control signal CS from the outside (e.g., a system board). The timing controller T-CON may generate image data DATA by converting data formats of the image signals RGB to data formats suitable for an interface specification with the data driver DDV. The timing controller T-CON may provide the data driver DDV with the image data DATA having the converted data formats.

The timing controller T-CON may generate and output a scan control signal CS1 and a data control signal CS2 in response to the control signal CS provided from the outside. The scan control signal CS1 may be provided to the scan driver SDV. The data control signal CS2 may be provided to the data driver DDV.

The scan driver SDV may generate a plurality of scan signals in response to the scan control signal CS1. The scan signals may be applied to the pixels PX through the scan lines SL1-SLm.

The data driver DDV may generate a plurality of data voltages corresponding to the image data DATA in response to the data control signal CS2. The data voltages may be applied to the pixels PX through the data lines DL1-DLn.

The pixels PX may receive the data voltages in response to the scan signals. The pixels PX may display an image by emitting light of luminance corresponding to the data voltages.

A first output voltage VOUT1 output from an output terminal of the voltage generator VG for outputting the first voltage ELVDD may be supplied to the short circuit protection part SPC. The first output voltage VOUT1 is boosted to a certain level to generate the first voltage ELVDD. Such an operation will be described in detail below.

The short circuit protection part SPC may compare the first output voltage VOUT1 with various comparison voltages and may output a shutdown signal SDS, based on the compared result. The shutdown signal SDS may be generated by the short circuit protection part SPC when a short circuit of the first power line PL1 occurs.

The first power line PL1 may be short-circuited with various lines. In this case, a level of the first output voltage VOUT1 may be changed. The short circuit protection part SPC may compare the changed level of the first output voltage VOUT1 with various comparison voltages and may detect a short circuit state. Such an operation will be described in detail below.

Figure 5:
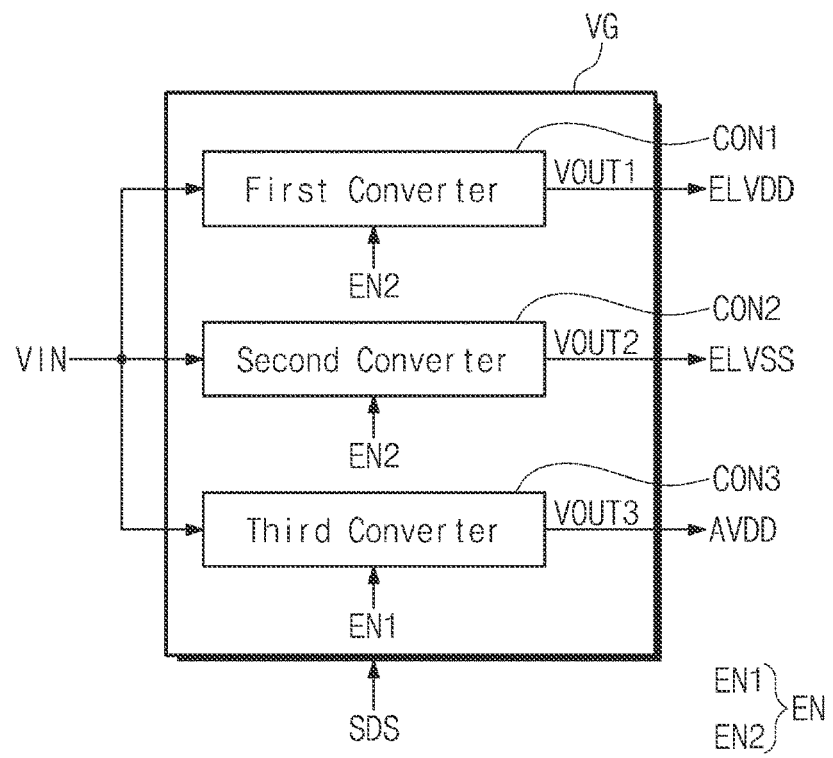
FIG. 5 is a drawing illustrating a configuration of a voltage generator illustrated in FIG. 4.

FIG. 5 is a drawing illustrating a configuration of a voltage generator illustrated in FIG. 4.

Referring to FIG. 5, a voltage generator VG may include a first converter CON1, a second converter CON2, and a third converter CON3. The first converter CON1 and the third converter CON3 may be defined as boost converters. The second converter CON2 may be defined as an inverting buck boost converter.

A control signal EN may include a first control signal EN1 and a second control signal EN2. The first control signal EN1 may be provided to the third converter CON3, and the second control signal EN2 may be provided to the first and second converters CON1 and CON2. The third converter CON3 may be driven (or activated) in response to the first control signal EN1. The first and second converters CON1 and CON2 may be driven (or activated) in response to the second control signal EN2.

An input voltage VIN may be supplied to the first, second, and third converters CON1, CON2, and CON3. The first converter CON1 may generate a first voltage ELVDD using the input voltage VIN. The first converter CON1 may convert the input voltage VIN into the first voltage ELVDD. A first output voltage VOUT1 of a first output terminal of the first converter CON1 may be output as the first voltage ELVDD.

The second converter CON2 may generate a second voltage ELVSS using the input voltage VIN. The second converter CON2 may convert the input voltage VIN into the second voltage ELVSS. A second output voltage VOUT2 of a second output terminal of the second converter CON2 may be output as the second voltage ELVSS.

The third converter CON3 may generate a third voltage AVDD using the input voltage VIN. The third converter CON3 may convert the input voltage VIN into the third voltage AVDD. A third output voltage VOUT3 of a third output terminal of the third converter CON3 may be output as the third voltage AVDD.

The voltage generator VG may receive a shutdown signal SDS from the short circuit protection circuit SPC when a short circuit occurs and shut down the voltage generator VG in response to the shutdown signal SDS. For example, operations of the first, second, and third converters CON1, CON2, and CON3 may be stopped by the shutdown signal SDS.

Figure 6:
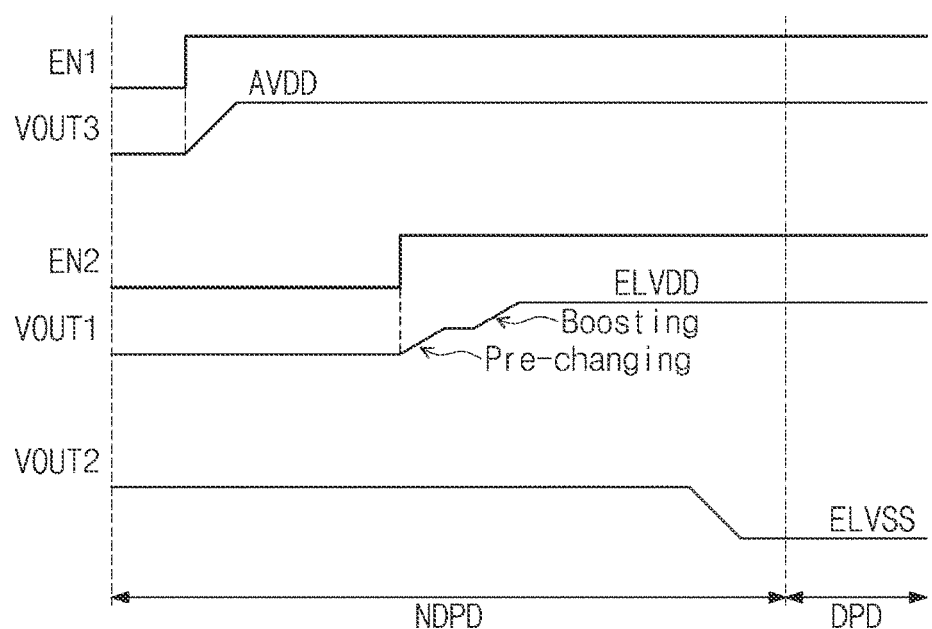
FIG. 6 is a timing diagram of first, second, and third voltages generated by a voltage generator illustrated in FIG. 5.

FIG. 6 is a timing diagram of first, second, and third voltages generated by a voltage generator illustrated in FIG. 5.

Referring to FIGS. 5 and 6, a first control signal EN1 may be first activated from a low level to a high level. A third converter CON3 may generate a third voltage AVDD in response to the activated first control signal EN1. After a third output voltage VOUT3 output from a third output terminal of the third converter CON3 rises, the third output voltage VOUT3 may be output as the third voltage AVDD.

Thereafter, a second control signal EN2 may be activated from the low level to the high level. A first converter CON1 may generate a first voltage ELVDD in response to the activated second control signal EN2. After a first output voltage VOUT1 output from a first output terminal of the first converter CON1 is pre-charged and boosted to the first output voltage VOUT1, the first output voltage VOUT1 may be output as the first voltage ELVDD.

A second converter CON2 may generate a second voltage ELVSS in response to the activated second control signal EN2. However, the second converter CON2 may generate the second voltage ELVSS after a certain period after the first voltage ELVDD is generated. After a second output voltage VOUT2 output from a second output terminal of the second converter CON2 falls, the second output voltage VOUT2 may be output as the second voltage ELVSS.

The first converter CON1 and the second converter CON2 may not be driven at the same time but be sequentially driven. In other words, the first converter CON1 may be first driven to generate the first voltage ELVDD, and the second converter CON2 is then driven to generate the second voltage ELVSS.

When the first and second converters CON1 and CON2 are driven at the same time such that the first and second voltages ELVDD and ELVSS are generated at the same time, a large current may momentarily flow in the first and second converters CON1 and CON2. Such a current may be defined as an inrush current. Elements in the first and second converters CON1 and CON2 may be damaged by the inrush current. However, when the first converter CON1 and the second converter CON2 are sequentially driven, the inrush current may not be generated.

For a similar reason, the third converter CON3 may be first driven, and then the first converter CON1 and the second converter CON2 may be sequentially driven.

The voltage generator VG may generate the first, second, and third voltages ELVDD, ELVSS, and AVDD during a non-display period NDPD. During the non-display period NDPD, the display panel DP may display a black image. During a display period DPD subsequent to the non-display period NDPD, as the display panel DP is driven by the first, second, and third voltages ELVDD, ELVSS, and AVDD, an image requested by a user may be displayed.

Figure 7:
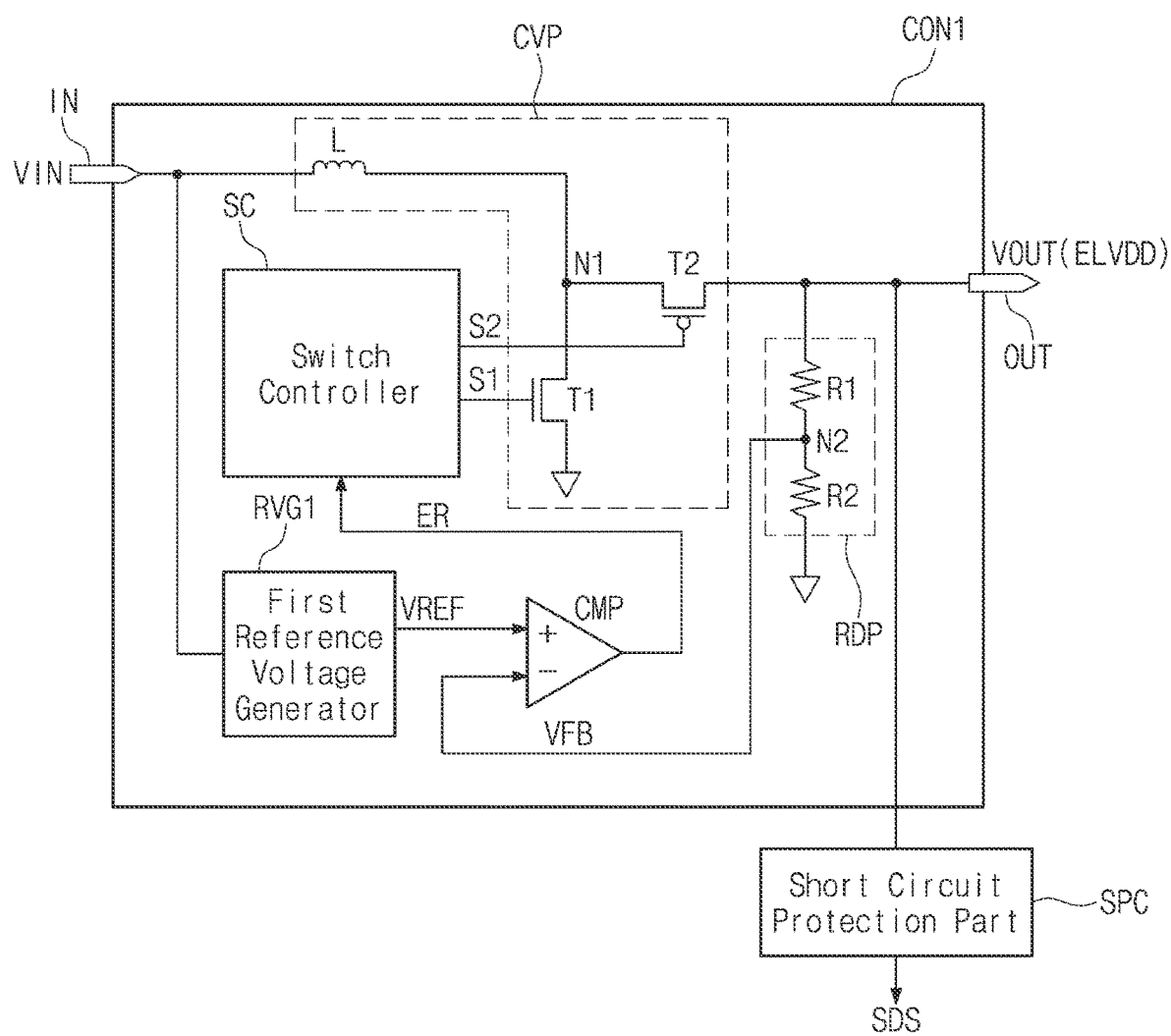
FIG. 7 is a diagram illustrating a configuration of a first converter illustrated in FIG. 6.

FIG. 7 is a diagram illustrating a configuration of a first converter illustrated in FIG. 6.

Hereinafter, a first output terminal of the first converter CON1 described above is defined as an output terminal OUT, and the first output voltage VOUT1 described above is defined as an output voltage VOUT.

Referring to FIG. 7, an input voltage VIN may be input to the first converter CON1 through an input terminal IN of the first converter CON1. The output voltage VOUT output from the first converter CON1 may be output through the output terminal OUT of the first converter CON1. The first converter CON1 may include a conversion part CVP, a resistance distribution part RDP, a comparator CMP, a switch controller SC, and a first reference voltage generator RVG1.

The conversion part CVP may convert the input voltage VIN supplied to the input terminal IN into a first voltage ELVDD and may output the first voltage ELVDD through the output terminal OUT. For example, the conversion part CVP may boost the input voltage VIN to generate the first voltage ELVDD. The output voltage VOUT of the output terminal OUT may rise to the first voltage ELVDD and output as the first voltage ELVDD.

For the operation, the conversion part CVP may include an inductor L, a first transistor T1, and a second transistor T2. The inductor L may be connected between the input terminal IN and a first node N1.

The first and second transistors T1 and T2 may be defined as switching elements. The first transistor T1 may be an NMOS, and the second transistor T2 may be a PMOS. Hereinafter, in the specification, any one of a source electrode and a drain electrode of each of the first and second transistors T1 and T2 may be referred to as a first electrode, and the other may be referred to as a second electrode. Furthermore, a gate electrode of each of the first and second transistors T1 and T2 may be referred to as a control electrode.

The control electrode of the first transistor T1 may be connected to the switch controller SC to receive a first switching signal S1 from the switch controller SC. The first electrode of the first transistor T1 may be connected to the first node N1 and the second electrode of the first transistor T1 may be connected to a ground terminal.

The control electrode of the second transistor T2 may be connected to the switch controller SC to receive a second switching signal S2 from the switch controller SC. The first electrode of the second transistor T2 may be connected to the first node N1 and the second electrode of the second transistor T2 may be connected to the output terminal OUT.

The resistance distribution part RDP may be connected between the output terminal OUT and the ground terminal.

The resistance distribution part RDP may distribute the first voltage ELVDD to generate a feedback voltage VFB. The resistance distribution part RDP may be defined as a feedback voltage generator. The feedback voltage VFB may be supplied to the comparator CMP.

To generate the feedback voltage VFB, the resistance distribution part RDP may include a first resistor R1 and a second resistor R2. The first resistor R1 may be connected between a second node N2 and the output terminal OUT. The second resistor R2 may be connected between the second node N2 and the ground terminal. The feedback voltage VFB may be a voltage of the second node N2.

The first reference voltage generator RVG1 may receive the input voltage VIN and may generate a reference voltage VREF using the input voltage VIN. The reference voltage VREF may be supplied to the comparator CMP.

The comparator CMP may receive the feedback voltage VFB from the resistance distribution part RDP and may receive the reference voltage VREF from the first reference voltage generator RVG1. The feedback voltage VFB may be input to a negative terminal (−) of the comparator CMP and the reference voltage VREF may be input to a positive terminal (+) of the comparator CMP. The comparator CMP may compare the reference voltage VREF with the feedback voltage VFB to output an error signal ER as the compared result. The comparator CMP may be defined as an error amplifier.

The error signal ER may be provided to the switch controller SC. The switch controller SC may control switching operations of the first and second transistors T1 and T2 depending on the error signal ER. The switch controller SC may control duty ratios of the first and second transistors T1 and T2 depending on the error signal ER. Thus, the level of the first voltage ELVDD may be changed.

In a boosting operation for generating the first voltage ELVDD, the first and second transistors T1 and T2 may be repeatedly turned on and off. According to such switching operations, a current of the inductor L may be charged and discharged and the output voltage VOUT may rise. Thus, the output voltage VOUT may be boosted and the first voltage ELVDD may be generated.

After the output voltage VOUT is boosted and the first voltage ELVDD is output, the level of the first voltage ELVDD may be changed. For example, the first voltage ELVDD may be changed according to external noise or the like.

When the level of the first voltage ELVDD is lower than a normal level, the feedback voltage VFB may become lower than the reference voltage VREF. On the other hand, when the level of the first voltage ELVDD is higher than the normal level, the feedback voltage VFB may become higher than the reference voltage VREF.

When the feedback voltage VFB is lower than the reference voltage VREF, the switch controller SC may control the duty ratios of the first and second transistors T1 and T2 such that the level of the first voltage ELVDD rises in response to the error signal ER. When the feedback voltage VFB is higher than the reference voltage VREF, the switch controller SC may control the duty ratios of the first and second transistors T1 and T2 such that the level of the first voltage ELVDD falls in response to the error signal ER.

According to such an operation, the level of the first voltage ELVDD may be kept constant. The comparator CMP and the switch controller SC may function as a voltage regulator.

A short circuit protection part SPC may be connected to the output terminal OUT. The short circuit protection part SPC may receive the output voltage VOUT of the output terminal OUT.

Figure 8:
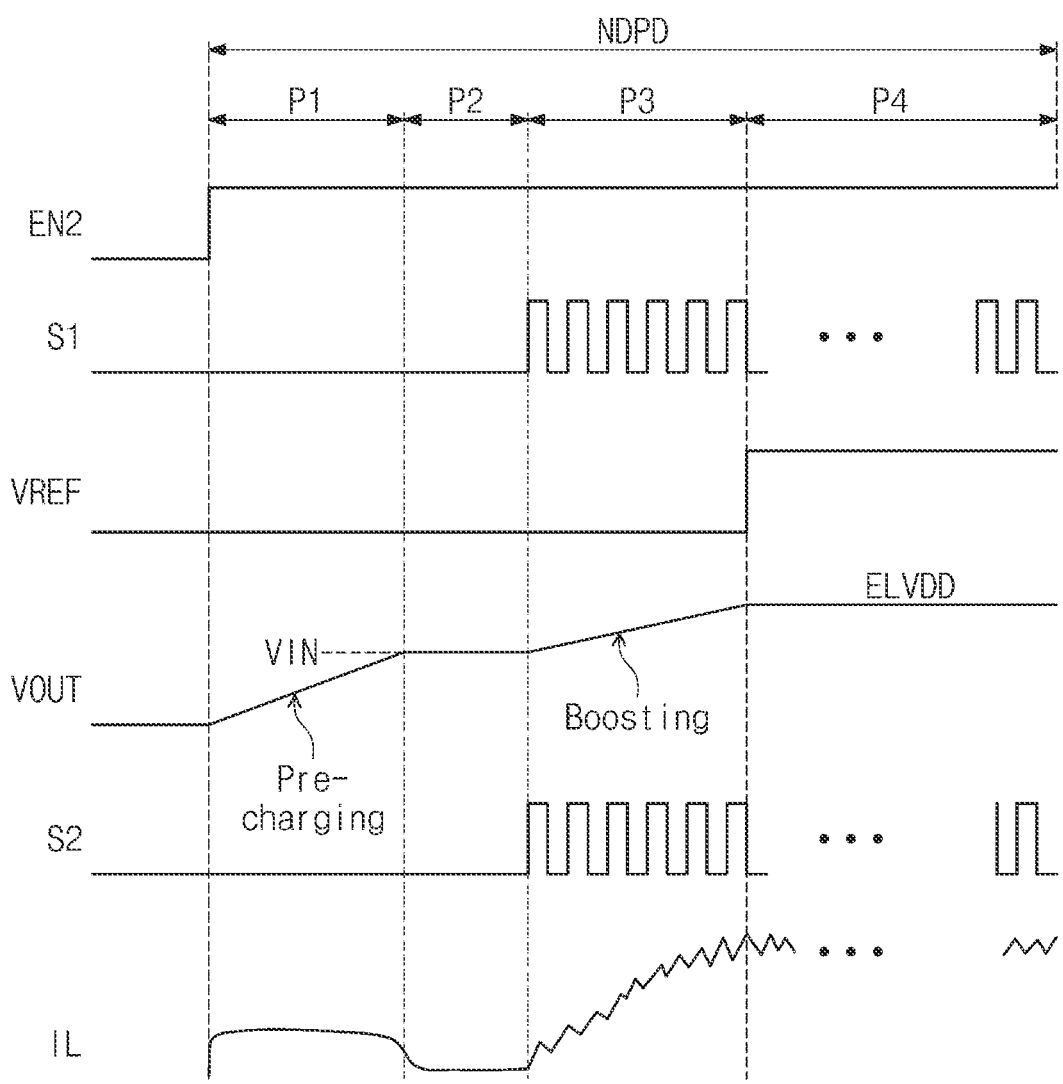
FIG. 8 is a timing diagram for describing an operation of a first converter illustrated in FIG. 7.

FIG. 8 is a timing diagram for describing an operation of a first converter illustrated in FIG. 7.

FIG. 8 illustrates a timing diagram of signals, when a first converter CON1 normally operates.

Referring to FIGS. 7 and 8, first, second, third, and fourth periods P1, P2, P3, and P4 illustrated in FIG. 8 may be included in a non-display period NDPD illustrated in FIG. 6. A second control signal EN2 may be activated at a start point of the first period P1.

In the first period P1, the first converter CON1 may pre-charge an output voltage VOUT to a predetermined voltage level. For example, in the first period P1, the first converter CON1 may gradually raise the output voltage VOUT to a level of an input voltage VIN. Such an operation may be defined as a pre-charging operation.

In detail, in the first period P1, a first transistor T1 may be turned off by a first switching signal S1 of a low level and a second transistor T2 may be turned on by a second switching signal S2 of the low level. As the input voltage VIN is supplied to an output terminal OUT through the turned-on second transistor T2, the output voltage VOUT may gradually rise to the level of the input voltage VIN.

The first converter CON1 may maintain the level of the output voltage VOUT during the second period P2 subsequent to the first period P1. The level of the output voltage VOUT, which rises to the level of the input voltage VIN, may not rise any longer in the second period P2 but may be maintained as the input voltage VIN.

The first converter CON1 may boost and output the output voltage VOUT as a first voltage ELVDD during the third period P3 subsequent to the second period P2. For example, during the third period P3, the first switching signal S1 and the second switching signal S2 may be repeatedly converted into the high and low levels. Such first and second switching signals S1 and S2 may be defined as pulse with modulation (PWM) signals.

In the third period P3, as the output voltage VOUT rises while the first and second transistors T1 and T2 are repeatedly turned on and off and an inductor current IL is charged and discharged, the first voltage ELVDD may be generated. In other words, as the output voltage VOUT is boosted, the first voltage ELVDD may be output.

When the output voltage VOUT is immediately boosted to the first voltage ELVDD without the first and second periods P1 and P2, the inductor current IL may sharply rise. In this case, an inrush current may be generated. However, in an embodiment of the present disclosure because the output voltage VOUT gradually rises through the first, second, and third periods P1, P2, and P3, the inrush current may not be generated. Such an operation may be defined as a soft start scheme.

In the fourth period P4 subsequent to the third period P3, a reference voltage VREF may be generated and provided to a comparator CMP. As described above, according to the comparison between the reference voltage VREF and the feedback voltage VFB in the comparator CMP, a switch controller SC may control the switching operations of the first and second transistors T1 and T2, such that the first voltage ELVDD maintains a certain level.

Figure 9:
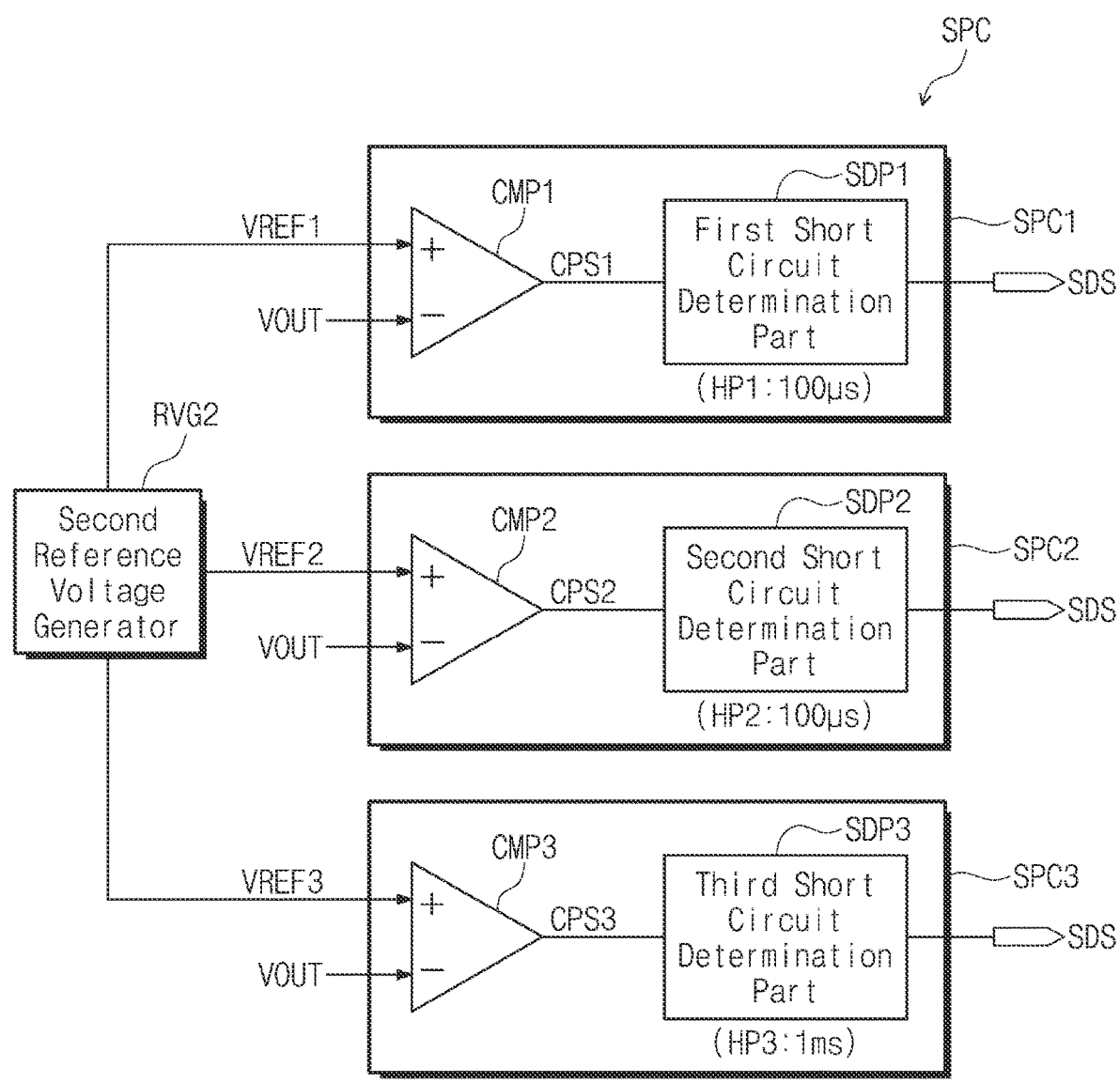
FIG. 9 is a drawing illustrating a configuration of a short circuit protection part illustrated in FIG. 7.

FIG. 9 is a drawing illustrating a configuration of a short circuit protection part illustrated in FIG. 7.

Referring to FIGS. 8 and 9, a short circuit protection part SPC may include a second reference voltage generator RVG2, a first short circuit protection part SPC1, a second short circuit protection part SPC2, and a third short circuit protection part SPC3.

The second reference voltage generator RVG2 may generate a first reference voltage VREF1, a second reference voltage VREF2, and a third reference voltage VREF3. The first reference voltage VREF1 may be supplied to the first short circuit protection part SPC1, the second reference voltage VREF2 may be supplied to the second short circuit protection part SPC2, and the third reference voltage VREF3 may be supplied to the third short circuit protection part SPC3.

The first reference voltage VREF1 may have a level lower than an input voltage VIN. For example, the first reference voltage VREF1 may be set to a value of 80% to 90% of the input voltage VIN. Illustratively, the input voltage VIN may be 4.5 V to 3.3 V, and the first reference voltage VREF1 may be set to a value obtained by subtracting 500 mV from the input voltage VIN.

The second reference voltage VREF2 may be set to 50% of a normal output voltage. The normal output voltage may be set to an initial level of a boosted output voltage VOUT. In other words, the normal output voltage may be substantially set to a normal first voltage ELVDD.

The third reference voltage VREF3 and the second reference voltage VREF2 may have different levels. For example, the third reference voltage VREF3 may be set to 85% of the normal output voltage. In other words, the third reference voltage VREF3 may have a level higher than the second initialization voltage VREF2.

The first short circuit protection part SPC1 and the second and third short circuit protection parts SPC2 and SPC3 may operate in different periods. The first short circuit protection part SPC1 may operate in the second period P2 to detect a short circuit state. The second and third short circuit protection parts SPC2 and SPC3 may operate in a display period DPD to detect a short circuit state.

The first short circuit protection part SPC1 may be connected to an output terminal OUT of a first converter CON1 to receive an output voltage VOUT. The first short circuit protection part SPC1 may receive the first reference voltage VREF1 from the second reference voltage generator RVG2.

In a second period P2, the first short circuit protection part SPC1 may compare the output voltage VOUT with the first reference voltage VREF1 and may output a shutdown signal SDS depending on the compared result. For example, in the second period P2, the first short circuit protection part SPC1 may output the shutdown signal SDS, when the output voltage VOUT has a level lower than that of the first reference voltage VREF1.

When a short circuit of a first power line PL1 occurs in a first period P1 where the output voltage VOUT is pre-charged, the output voltage VOUT may not be normally pre-charged. When the short circuit occurs, the output voltage VOUT may not be charged to a level of the input voltage VIN. For example, the output voltage VOUT may be charged to a level lower than that of the first reference voltage VREF1.

When the output voltage VOUT is charged to the level lower than that of the first reference voltage VREF1, in the second period P2, the first short circuit protection part SPC1 may provide a voltage generator VG with the shutdown signal SDS. In other words, the first short circuit protection part SPC1 may determine a short circuit state in the period where the output voltage VOUT is pre-charged.

For example, in the second period P2, when the output voltage VOUT maintains the level lower than that of the first reference voltage VREF1 during a first holding period HP1, the first short circuit protection part SPC1 may output the shutdown signal SDS. Illustratively, the first holding period HP1 may be set to 100 µs.

The output voltage VOUT may be momentarily changed according to external noise. In other words, although it is not in the short circuit state, the output voltage VOUT may be temporarily changed to be lower than the first reference voltage VREF1 and restored to an original state.

However, when a short circuit occurs, the output voltage VOUT may be maintained at a level lower than that of the first reference voltage VREF1. For example, to determine a more accurate short circuit state, when the output voltage VOUT maintains the level lower than that of the first reference voltage VREF1 during the first holding period HP1, the first short circuit protection part SPC1 may output the shutdown signal SDS.

The first short circuit protection part SPC1 may include a first comparator CMP1 and a first short circuit determination part SDP1. The first reference voltage VREF1 may be input to a positive terminal (+) of the first comparator CMP1, and the output voltage VOUT may be input to a negative terminal (−) of the first comparator CMP1.

The first comparator CMP1 may compare the output voltage VOUT with the first reference voltage VREF1 and may output a first comparison signal CPS1, when the output voltage VOUT has the level lower than that of the first reference voltage VREF1.

When the first comparison signal CPS1 is maintained during the first holding period HP1, the first short circuit determination part SDP1 may output the shutdown signal SDS as the first comparison signal CPS1. Although not illustrated, the first short circuit determination part SDP1 may include a counter which counts a holding time of the first comparison signal CPS1.

Thus, when a short circuit occurs in a first period P1 which is a pre-charging period, a voltage generator VG may be shut down in response to the shutdown signal SDS. As a result, when the short circuit occurs in the first period P1, the voltage generator VG may be protected.

In an embodiment of the present disclosure, the first short circuit determination part SDP1 may be omitted. In such a case, a first comparison signal CPS1 may be immediately output as the shutdown signal SDS.

The second short circuit protection part SPC2 may be connected to the output terminal OUT of the first converter CON1 to receive the output voltage VOUT. The second short circuit protection part SPC2 may receive a second reference voltage VREF2 from the second reference voltage generator RVG2.

During an image display period DPD, the second short circuit protection part SPC2 may compare the output voltage VOUT with the second reference voltage VREF2 and may output the shutdown signal SDS depending on the compared result. For example, in the image display period DPD, when the output voltage VOUT has a level lower than that of the second reference voltage VREF2, the second short circuit protection part SPC2 may output the shutdown signal SDS.

When a short circuit of a first power line PL1 occurs in the image display period DPD, the output voltage VOUT may fail to maintain a normal level. For example, when the short circuit occurs, the output voltage VOUT may change to the level lower than that of the second reference voltage VREF2. The normal level of the output voltage VOUT may be defined as a level of the normal output voltage or the normal first voltage ELVDD, which is described above.

When the output voltage VOUT has the level lower than that of the second reference voltage VREF2, the second short circuit protection part SPC2 may provide the voltage generator VG with the shutdown signal SDS. In other words, the second short circuit protection part SPC2 may determine a short circuit state in the image display period DPD.

For example, in the image display period DPD, when the output voltage VOUT maintains the level lower than that of the second reference voltage VREF2 during a second holding period HP2, the second short circuit protection part SPC2 may output the shutdown signal SDS. Illustratively, the second holding period HP2 may be set to 100 µs.

The output voltage VOUT may be momentarily changed according to external noise. However, when the short circuit occurs, the output voltage VOUT may be maintained at the level lower than that of the second reference voltage VREF2. For example, when the output voltage VOUT maintains the level lower than that of the second reference voltage VREF2 during the second holding period HP2, the second short circuit protection part SPC2 may output the shutdown signal SDS.

The second short circuit protection part SPC2 may include a second comparator CMP2 and a second short circuit determination part SDP2. The second reference voltage VREF2 may be input to a positive terminal (+) of the second comparator CMP2, and the output voltage VOUT may be input to a negative terminal (−) of the second comparator CMP2.

The second comparator CMP2 may compare the output voltage VOUT with the second reference voltage VREF2 and may output a second comparison signal CPS2, when the output voltage VOUT has the level lower than that of the second reference voltage VREF2.

When the second comparison signal CPS2 is maintained during the second holding period HP2, the second short circuit determination part SDP2 may output the shutdown signal SDS as the second comparison signal CPS2. Although not illustrated, the second short circuit determination part SDP2 may include a counter which counts a holding time of the second comparison signal CPS2.

Thus, when the short circuit occurs in the image display period DPD, the voltage generator VG may be shut down in response to the shutdown signal SDS. As a result, when the short circuit occurs in the image display period DPD, the voltage generator VG may be protected.

In an embodiment of the present disclosure, the second short circuit determination part SDP2 may be omitted. In such a case, the second comparison signal CPS2 may be immediately output as the shutdown signal SDS.

The third short circuit protection part SPC3 may be connected to the output terminal OUT of the first converter CON1 to receive the output voltage VOUT. The third short circuit protection part SPC3 may receive a third reference voltage VREF3 from the second reference voltage generator RVG2.

During the image display period DPD, the third short circuit protection part SPC3 may compare the output voltage VOUT with the third reference voltage VREF3 and may output the shutdown signal SDS depending on the compared result. For example, in the image display period DPD, when the output voltage VOUT has a level lower than that of the third reference voltage VREF3, the third short circuit protection part SPC3 may output the shutdown signal SDS.

When the short circuit of the first power line PL1 occurs in the image display period DPD, the output voltage VOUT may fail to be maintained at a normal level. For example, when the short circuit occurs, the output voltage VOUT may change to the level lower than that of the third reference voltage VREF3.

When the output voltage VOUT has the level lower than that of the third reference voltage VREF3, the third short circuit protection part SPC3 may provide the voltage generator VG with the shutdown signal SDS. In other words, in addition, the third short circuit protection part SPC3 may determine a short circuit state in the image display period DPD.

For example, in the image display period DPD, when the output voltage VOUT maintains the level lower than that of the third reference voltage VREF3 during a third holding period HP3, the third short circuit protection part SPC3 may output the shutdown signal SDS. The third holding period HP3 may be longer than the second holding period HP2. Illustratively, the third holding period HP3 may be set to 1 ms.

As described above, the output voltage VOUT may be momentarily changed according to external noise, but, when the short circuit occurs, the output voltage VOUT may be maintained at the level lower than that of the third reference voltage VREF3. Thus, when the output voltage VOUT maintains the level lower than that of the third reference voltage VREF3 during the third holding period HP3, the third short circuit protection part SPC3 may output the shutdown signal SDS.

The third short circuit protection part SPC3 may include a third comparator CMP3 and a third short circuit determination part SDP3. The third reference voltage VREF3 may be input to a positive terminal (+) of the third comparator CMP3, and the output voltage VOUT may be input to a negative terminal (−) of the third comparator CMP3.

The third comparator CMP3 may compare the output voltage VOUT with the third reference voltage VREF3 and may output a third comparison signal CPS3, when the output voltage VOUT has the level lower than that of the third reference voltage VREF3.

When the third comparison signal CPS3 is maintained during the third holding period HP3, the third short circuit determination part SDP3 may output the shutdown signal SDS as the third comparison signal CPS3. Thus, when the short circuit occurs in the image display period DPD, the voltage generator VG may be shut down in response to the shutdown signal SDS.

In an embodiment of the present disclosure, the third short circuit determination part SDP3 may be omitted. In such a case, the third comparison signal CPS3 may be immediately output as the shutdown signal SDS.

The first power line PL1 may be short-circuited with various lines. In this case, the level of the output voltage VOUT may be changed to various levels. The level of the output voltage VOUT may change to be lower, or the level of the output voltage VOUT may change to be higher. When the level of the output voltage VOUT changes to be lower, the third reference voltage VREF3 may be used. When the level of the output voltage VOUT changes to be higher, the second reference voltage VREF2 may be used.

When the level of the output voltage VOUT changes to be higher, the shutdown signal SDS may be output by the second short circuit protection part SPC2 which receives the second reference voltage VREF2 corresponding to 50% of the normal output voltage. When the level of the output voltage VOUT changes to be lower, the shutdown signal SDS may be output by the third short circuit protection part SPC3 which receives the third reference voltage VREF3 corresponding to 85% of the normal output voltage.

Figure 10:
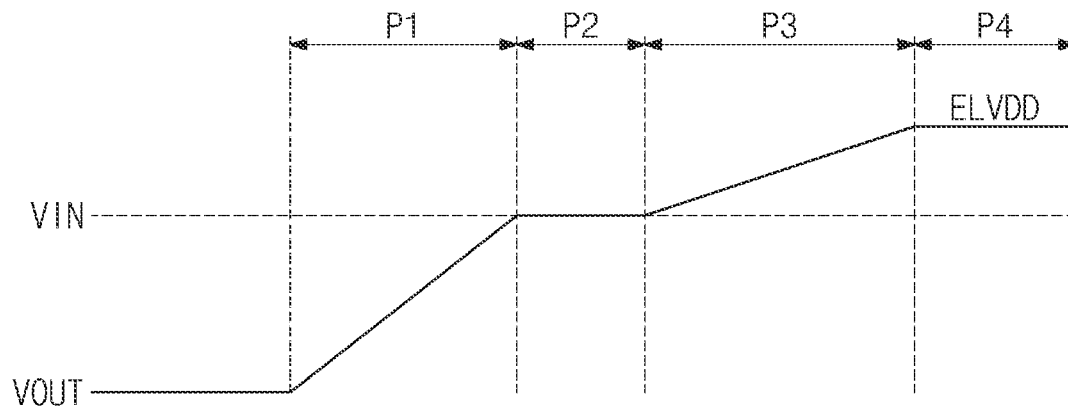
FIG. 10 is a timing diagram illustrating a change in level of an output voltage of a first converter in a normal operation.
Figure 11:
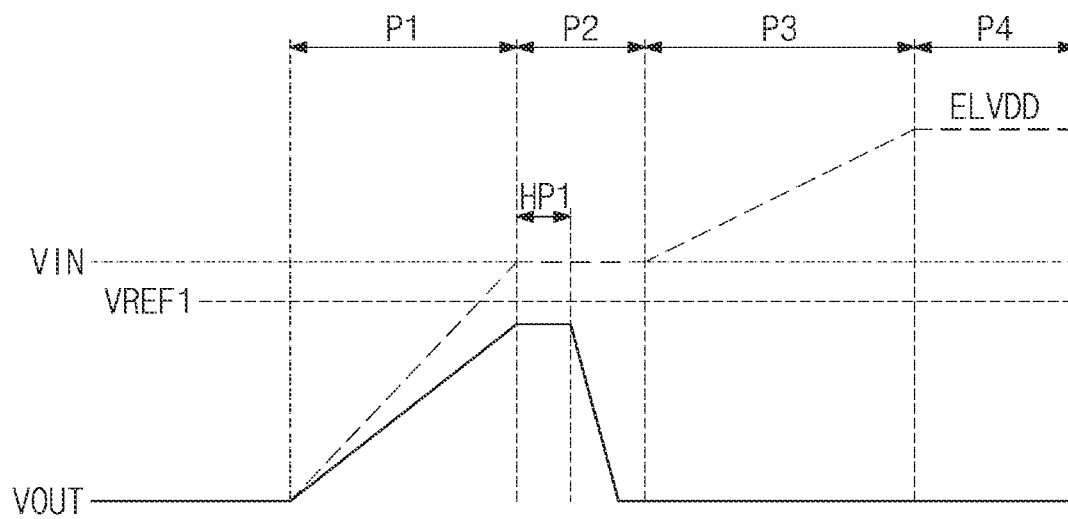
FIG. 11 is a timing diagram illustrating a change in level of an output voltage of a first converter when a short circuit occurs.

FIG. 10 is a timing diagram illustrating a change in level of an output voltage of a first converter in a normal operation. FIG. 11 is a timing diagram illustrating a change in level of an output voltage of a first converter when a short circuit occurs.

Illustratively, Timing of an output voltage VOUT in a normal state is illustrated with a dotted line.

Referring to FIG. 10, when a short circuit does not occur and when a voltage generator VG normally operates, as described in FIG. 8, an output voltage VOUT of the first converter CON1 may be pre-charged and boosted and a first voltage ELVDD may be generated.

Referring to FIGS. 9 and 11, when a short circuit occurs in a first period P1, the output voltage VOUT may fail to be pre-charged to a level of an input voltage VIN. When the short circuit occurs in the first period P1, the output voltage VOUT may be pre-charged to a level lower than that of the input voltage VIN. For example, the output voltage VOUT may be pre-charged to a level lower than that of the first reference voltage VREF1.

For example, when the output voltage VOUT maintains the level lower than that of the first reference voltage VREF1 during a first holding period HP1 in a second period P2, a first short circuit protection part SPC1 may output a shutdown signal SDS. A voltage generator VG may be shut down in response to the shutdown signal SDS. Thus, the level of the output voltage VOUT may be down after the first holding period HP1. The first holding period HP1 may be shorter than a second period P2. According to such an operation, when a short circuit occurs, the voltage generator VG may be shut down.

According to an embodiment of the present disclosure, the first converter may pre-charge an output voltage to a predetermined voltage level during a first period and may maintain the level of the output voltage during a second period subsequent to the first period. When the short circuit occurs and the output voltage has a level lower than that of a first reference voltage in the second period, the first short circuit protection part may output a shutdown signal to shut down the voltage generator.

Furthermore, when the short circuit occurs during a display period where a first voltage and a second voltage are applied to pixels, the second and third short circuit protection parts may output the shutdown signal to shut down the voltage generator. Thus, when the short circuit of the power line occurs, the voltage generator may be protected.

While the present disclosure has been described with reference to an embodiment thereof, it will be apparent to those of ordinary skill in the art that various changes and modifications may be made thereto without departing from the spirit and scope of the present disclosure as set forth in the following claims. Furthermore, an embodiment disclosed in the present disclosure is not intended to limit the technical scope of the present disclosure, but all technical scopes in the scope of the following claims and the scope equivalent to the claims of the present disclosure should be interpreted as being included in the claims of the present disclosure.

What is claimed is:

1. A display device, comprising:
   a voltage generator including a first converter configured to generate a first voltage using an input voltage and configured to be shut down in response to a shutdown signal;
   a display panel including a pixel for receiving the first voltage; and
   a short circuit protection part including a first short circuit protection part configured to compare an output voltage of an output terminal of the first converter with a first reference voltage and output the shutdown signal depending on the compared result,
   wherein the first converter pre-charges the output voltage to a predetermined voltage level during a first period, maintains a level of the output voltage during a second period subsequent to the first period, and boosts and outputs the output voltage as the first voltage during a third period subsequent to the second period, and
   wherein the first short circuit protection part outputs the shutdown signal when the output voltage in the second period has a level lower than that of the first reference voltage.

2. The display device of claim 1, wherein the first reference voltage has a level lower than that of the input voltage.

3. The display device of claim 1, wherein the first reference voltage is about 80% to about 90% of the input voltage.

4. The display device of claim 1, wherein the first reference voltage is a value obtained by subtracting 500 mV from the input voltage.

5. The display device of claim 1, wherein the first short circuit protection part outputs the shutdown signal when the output voltage maintains a level lower than that of the first reference voltage during a first holding period in the second period.

6. The display device of claim 1, wherein the first short circuit protection part includes:
   a first comparator configured to compare the output voltage with the first reference voltage and output a first comparison signal when the output voltage has a level lower than that of the first reference voltage.

7. The display device of claim 6, wherein the first comparison signal is the shutdown signal.

8. The display device of claim 6, wherein the first short circuit protection part further includes:
   a first short circuit determination part configured to output the shutdown signal as the first comparison signal when the first comparison signal is maintained during a first holding period.

9. The display device of claim 8, wherein the first holding period is shorter than the second period.

10. The display device of claim 1, wherein the voltage generator further includes:
    a second converter configured to generate a second voltage having a level lower than that of the first voltage using the input voltage, and
    wherein the pixel is driven by the first voltage and the second voltage to display an image in an image display period.

11. The display device of claim 10, wherein the short circuit protection part further includes:
    a second short circuit protection part configured to compare the output voltage with a second reference voltage during the image display period and output the shutdown signal when the output voltage has a level lower than that of the second reference voltage; and
    a third short circuit protection part configured to compare the output voltage with a third reference voltage during the image display period and output the shutdown signal when the output voltage has a level lower than that of the third reference voltage, and
    wherein the third reference voltage and the second reference voltage have different levels.

12. The display device of claim 11, wherein the third reference voltage has a level higher than that of the second reference voltage.

13. The display device of claim 11, wherein the second reference voltage is about 50% of a normal output voltage which is an initial level of the boosted output voltage.

14. The display device of claim 13, wherein the third reference voltage is about 85% of the normal output voltage.

15. The display device of claim 11, wherein the second short circuit protection part outputs the shutdown signal when the output voltage has the level lower than that of the second reference voltage during a second holding period.

16. The display device of claim 15, wherein the third short circuit protection part outputs the shutdown signal when the output voltage has the level lower than that of the third reference voltage during a third holding period, and
wherein the third holding period is longer than the second holding period.

17. The display device of claim 11, wherein the second short circuit protection part includes:
a second comparator configured to compare the output voltage with the second reference voltage and output a second comparison signal when the output voltage has the level lower than that of the second reference voltage; and
a second short circuit determination part configured to output the shutdown signal as the second comparison signal when the second comparison signal is maintained during a second holding period.

18. The display device of claim 11, wherein the third short circuit protection part includes:
a third comparator configured to compare the output voltage with the third reference voltage and output a third comparison signal when the output voltage has the level lower than that of the third reference voltage; and
a third short circuit determination part configured to output the shutdown signal as the third comparison signal when the third comparison signal is maintained during a third holding period.

19. A display device, comprising:
a voltage generator including a first converter configured to generate a first voltage using an input voltage and configured to be shut down in response to a shutdown signal;
a display panel including a pixel for receiving the first voltage; and
a short circuit protection part including a first short circuit protection part configured to compare an output voltage of an output terminal of the first converter outputting the first voltage with a first reference voltage and output the shutdown signal depending on the compared result,
wherein the first converter pre-charges the output voltage to a predetermined voltage level during a first period, maintains a level of the output voltage during a second period subsequent to the first period, and boosts and outputs the output voltage as the first voltage during a third period subsequent to the second period, and
wherein the first short circuit protection part outputs the shutdown signal when the output voltage has a level lower than that of the first reference voltage and maintains the level lower than that of the first reference voltage during a first holding period in the second period.

20. The display device of claim 19, wherein the first holding period is shorter than the second period.

* * * * *